US006562487B1

(12) United States Patent
Vas'ko et al.

(10) Patent No.: US 6,562,487 B1
(45) Date of Patent: May 13, 2003

(54) WRITER POLE EMPLOYING A HIGH SATURATION MOMENT, LOW PERMEABILITY LAYER ADJACENT TO WRITER GAP

(75) Inventors: Vladyslav A. Vas'ko, Minneapolis, MN (US); Venkateswara R. Inturi, Eden Prairie, MN (US); Mark Kief, Savage, MN (US); Steven Riemer, Minneapolis, MN (US); Martin L. Plumer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 151 days.

(21) Appl. No.: 09/835,530

(22) Filed: Apr. 16, 2001

Related U.S. Application Data

(60) Provisional application No. 60/222,109, filed on Jul. 28, 2000.

(51) Int. Cl.[7] ................................................ G11B 5/66
(52) U.S. Cl. ............ 428/692; 428/694 R; 428/694 TM; 428/694 TS; 428/900; 360/113; 360/128
(58) Field of Search .............................. 428/692, 694 R, 428/694 TM, 694 TS, 900; 360/113, 128

(56) References Cited

U.S. PATENT DOCUMENTS

| | | | |
|---|---|---|---|
| 5,543,973 A | 8/1996 | Moriyama ................ 360/17 |
| 5,552,589 A | 9/1996 | Smith et al. .............. 235/449 |
| 5,576,098 A | 11/1996 | Arimoto et al. ........... 428/332 |
| 5,585,977 A | 12/1996 | Gooch ..................... 360/84 |
| 5,593,513 A | 1/1997 | Ramanan et al. .......... 148/304 |
| 5,593,518 A | 1/1997 | Ramanan ................. 140/304 |
| 5,602,704 A | 2/1997 | Gooch et al. ............. 360/125 |
| 5,606,478 A | 2/1997 | Chen et al. ............... 360/126 |
| 5,639,509 A | 6/1997 | Schemmel ............... 427/130 |
| 5,663,857 A | 9/1997 | Kumura et al. ........... 360/126 |
| 5,701,223 A | 12/1997 | Fontana, Jr. et al. ...... 360/113 |
| 5,729,413 A | 3/1998 | Gooch et al. ............. 360/125 |
| 5,742,457 A | 4/1998 | Simmons et al. ......... 360/113 |
| 5,751,526 A | 5/1998 | Schemmel ............... 360/113 |
| 5,768,073 A | 6/1998 | Nepela et al. ............ 360/126 |
| 5,812,350 A | 9/1998 | Chen et al. ............... 360/126 |
| 5,856,899 A | 1/1999 | Aoyagi et al. ............ 360/127 |
| 5,864,450 A | 1/1999 | Chen et al. ............... 360/113 |
| 5,871,593 A | 2/1999 | Fish et al. ................ 148/304 |
| 5,926,350 A | 7/1999 | Chiu et al. ............... 360/121 |
| 5,949,624 A | 9/1999 | Simmons et al. ......... 360/113 |
| 5,966,800 A | 10/1999 | Huai et al. ............... 29/603.13 |
| 6,038,110 A | 3/2000 | Aboaf et al. ............. 360/126 |
| 6,056,996 A | 5/2000 | Yoda et al. .............. 427/130 |
| 6,115,216 A | 9/2000 | Yoda et al. .............. 360/113 |
| 6,118,629 A | 9/2000 | Huai et al. .............. 360/126 |
| 6,342,311 B1 * | 1/2002 | Inuri et al. .............. 428/692 |

* cited by examiner

*Primary Examiner*—Leszek Kiliman
(74) *Attorney, Agent, or Firm*—Westman, Champlin & Kelly

(57) ABSTRACT

A magnetic head in a magnetic storage system is provided in which materials that do not individually display high permeability and low coercivity are satisfactorily employed in a write head when coupled to adjacent high permeability layers. The magnetic head includes a gap layer which separates a pair of poles. At least one pole of the pair of poles includes a pole layer formed of a high permeability material and a seed layer adjacent to the pole layer. The seed layer is formed of a high moment low permeability material having a high saturation magnetic moment greater than 2.1 Tesla and a low permeability of about 10–100. The high permeability material of the pole layer causes the permeability of the adjacent seed layer to substantially increase from about 10–100 to about 1400–1600, thereby providing a pole with high permeability and high saturation moment. In addition, a method of forming a magnetic head for use in a magnetic storage system is provided.

19 Claims, 5 Drawing Sheets

WRITER POLE EMPLOYING A HIGH SATURATION MOMENT, LOW PERMEABILITY LAYER ADJACENT TO WRITER GAP

CROSS-REFERENCE TO RELATED APPLICATION

This application claims benefit of U.S. Provisional Application No. 60/222,109, filed Jul. 28, 2000, and entitled "WRITER POLE EMPLOYING A HIGH SATURATION MOMENT, LOW PERMEABILITY LAYER ADJACENT TO WRITE GAP"; and the following U.S. patent application, assigned to the same assignee as the present invention, is related to the present application:

U.S. patent application Ser. No. 09/588,394, entitled "HIGH MAGNETIC MOMENT SEED LAYER MATERIALS FOR WRITER POLE TIPS," filed on Jun. 6, 2000, now U.S. Pat. No. 6,342,311.

FIELD OF THE INVENTION

The present invention relates to magnetic data storage systems. In particular, the invention relates to a magnetic write head pole (writer pole) used in such systems.

BACKGROUND OF THE INVENTION

Magnetic heads mounted on a magnetic disc drive are required to provide larger magnetic fields with higher gradient for magnetic recording at higher density. More recent magnetic heads combine both a magnetoresistive (MR) or giant magnetoresistive (GMR) element for reading information from a magnetic medium and an inductive element for writing information to such a magnetic medium. Such magnetic heads are typically referred to as composite thin film magnetic heads or merged MR heads. The magnetic head is mounted or embedded in a slider which is supported in transducing relationship with respect to a magnetic medium.

The inductive write head element includes first and second poles which have first and second pole tips respectively. The pole tips are separated by a gap at an air bearing surface (ABS) or head surface. A coil is positioned between the first and second poles. Information is written on the magnetic medium at the first and second pole tips.

Flux density, which is a measure of the quantity of magnetism, needs to be high in the inductive head element for it to provide a high magnetic field for writing. There are limitations to the capability of the inductive head element to provide high flux density since materials have a saturation level beyond which they will conduct no more flux. Similarly, magnetic moment, which is a measure of the strength of the magnet, does not change beyond a certain level (reaches saturation) even if the strength of the applied magnetic field is increased. A high saturation magnetic moment is very desirable for write heads recording at high areal densities, the areal density being the amount of data that can be squeezed on to a given area of the magnetic medium. Further, finite element modeling or analysis of magnetic recording indicates that a high saturation magnetic moment is particularly critical for those magnetic layers adjacent to the non-magnetic gap layer of the write head.

The use of materials with high magnetic moment for writer pole tips allows for the generation of higher magnetic fields in the magnetic media, larger field gradients, and faster effective rise times. Improvements, such as narrower pulse widths, smaller erase bands, and straighter transitions for given media properties are possible if materials with high magnetic moment are used for the poles. In addition, increased over-write (OVW) on magnetic media having high coercivity can also be achieved with high moment poles. OVW, expressed in dB, is a measure of how well prior recorded information can be erased by over writing the medium with a different signal. All the above advantages become even more important at high areal densities of magnetic recording.

The prior art teaches that in order to practically achieve a higher field in the gap, a seed and/or capping layer can be used adjacent to the gap to minimize saturation of pole tips and produce a higher gap field. Further, the prior art suggests that all of the individual magnetic layers utilized in the write head should possess high magnetic permeability and moderately soft magnetic properties in addition to a desirable saturation magnetic moment. Prior art write heads have employed individual layers of magnetic materials that each possess a combination of the above desirable properties, thereby limiting the choice of the saturation magnetic moment level to materials that have high magnetic permeability and moderately soft magnetic properties.

The present invention addresses these problems, and offers other advantages over the prior art.

SUMMARY OF THE INVENTION

The present invention relates to data storage systems that include a magnetic head with at least one pole having a seed layer made of a material with a low permeability by itself and a high saturation moment magnetically coupled to an adjacent high permeability layer which causes the permeability of the seed layer material to increase, thereby addressing the above-identified problems.

A magnetic head in a magnetic storage system is provided in which materials that do not individually display high permeability and low coercivity are satisfactorily employed in a write head when coupled to adjacent high permeability layers. The magnetic write head includes a gap layer which separates a pair of poles. At least one pole of the pair of poles includes a pole layer formed of a high permeability material and a seed layer adjacent to the pole layer. The seed layer is formed of a high moment low permeability material having a high saturation magnetic moment greater than about 2.1 Tesla and a low permeability of about 10–100. The high permeability material of the pole layer causes the permeability of the adjacent seed layer to substantially increase from about 10–100 to about 1400–1600, thereby providing a pole with high permeability and high saturation moment. In addition, a method of forming a magnetic head for use in a magnetic storage system is provided.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
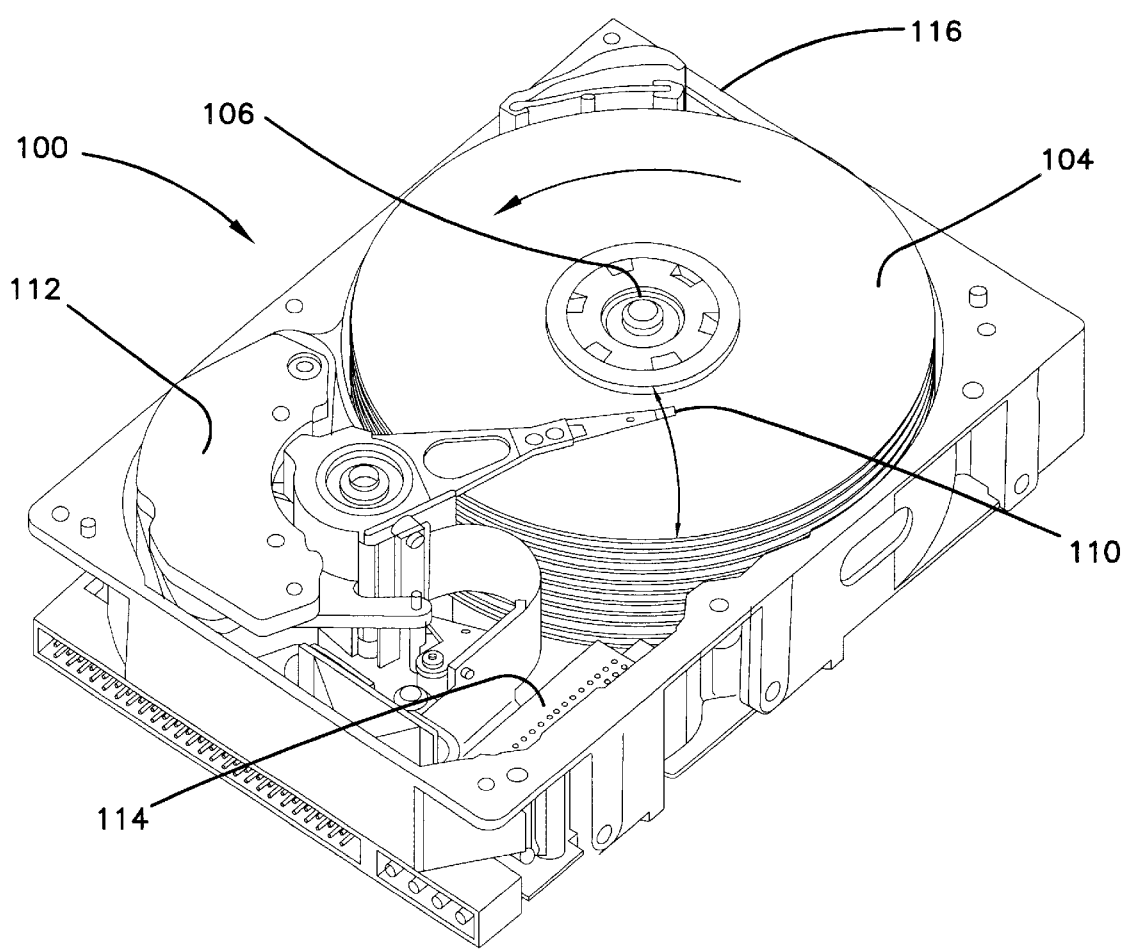
FIGS. 1 and 2 are diagrammatic and system block views, respectively, of an exemplary fixed disc drive for which embodiments of the present invention are useful.
Figure 2:
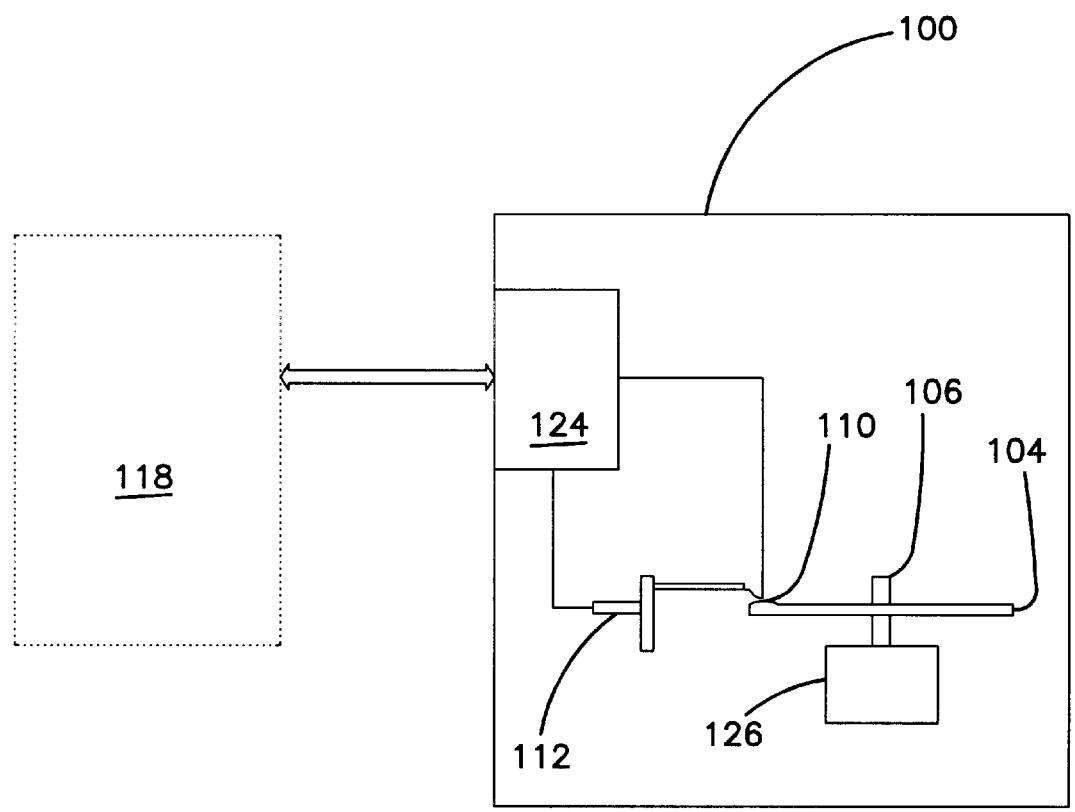

Referring now to FIG. 1, a diagrammatic view of disc drive 100 with which the present invention is useful is shown. Disc drive 100 includes discs 104, spindle 106, spindle motor 126 (shown in FIG. 2), magnetic head 110, actuator 112, and board electronics 114. Board electronics 114 include disc controller 124 (shown in FIG. 2).

Controller 124 is typically a microprocessor, or digital computer, and is coupled to a host system 118, or another drive controller which controls a plurality of drives. Controller 124 operates based on programmed instructions received from the host system.

Discs 104 are fixed about spindle 106, which is coupled to spindle motor 126 such that energization of spindle motor 126 causes spindle 106 and discs 104 to rotate. When discs 104 rotate, magnetic heads 110 fly above/below discs 104 on thin films of air or liquid that carry magnetic heads 110 for communicating with the respective disc surface. Actuator 112 is coupled to controller 124 and is adapted to move heads 110 relative to the surfaces of discs 104 in response to an actuation signal from controller 124.

Magnetic heads 110 may be a merged MR head employed for recording information in multiple circular tracks on the respective disc surfaces as well as for reading information therefrom.

Figure 3:
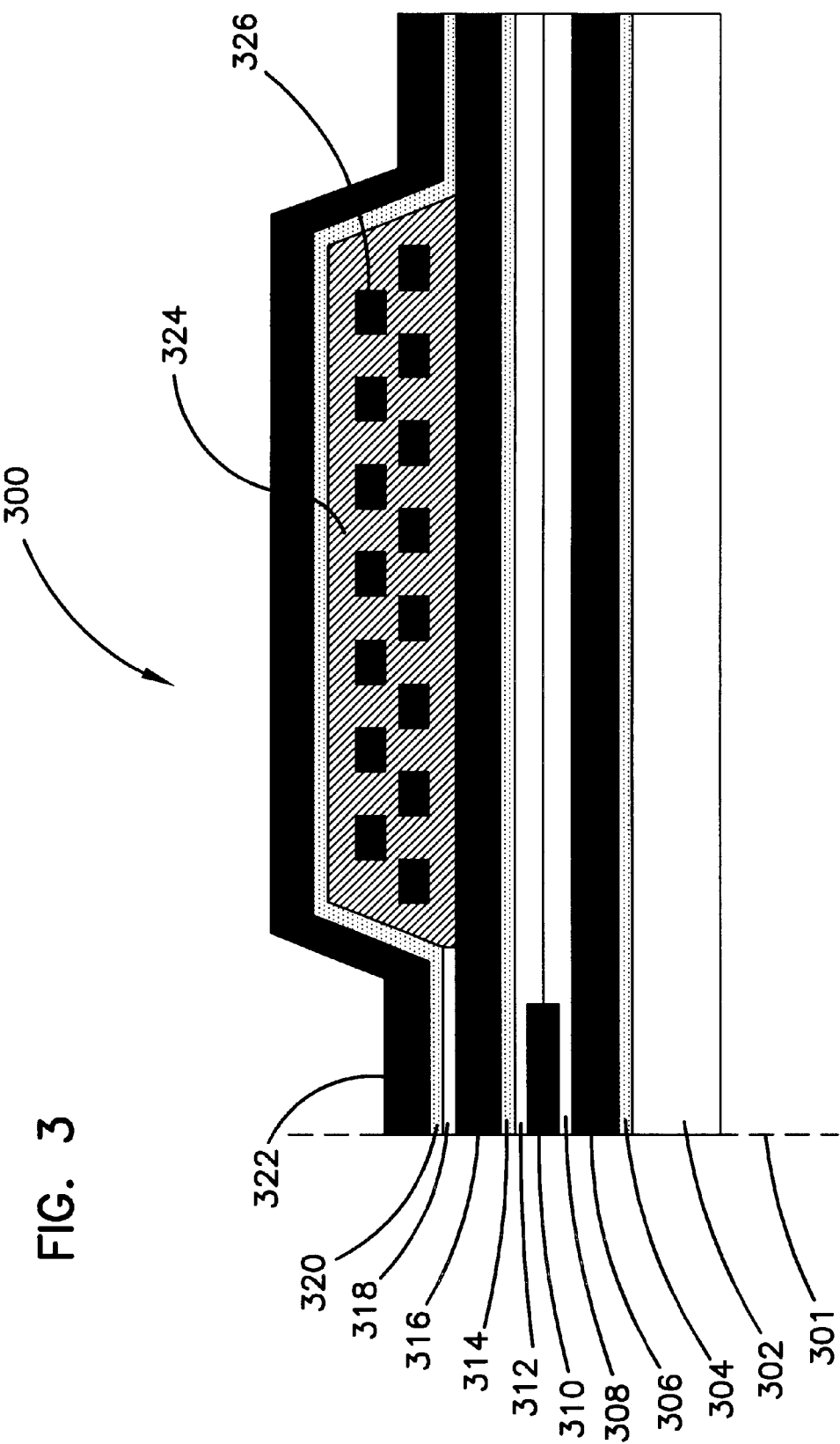
FIG. 3 is a cross-sectional view of a prior art transducing head taken along a plane normal to an ABS of the transducing head.

Referring now to FIG. 3, a cross-sectional view of prior art merged MR head 300 taken along a plane normal to ABS 301 is shown. Fabrication of MR head 300 involves the deposition of several layers through a photolithographic process. Typically, thin film layers are deposited to form the read portion of merged MR head 300 after which additional thin film layers are deposited to form the write head portion. Bottom shield seed layer 304 is formed by deposition on substrate 302. Bottom shield layer 306 is deposited on top of bottom shield seed layer 304. First half-gap layer 308 is then formed on top of bottom shield layer 306. Then, a series of depositions, etching, milling and lift-off processes are performed to fabricate MR or GMR sensor 310 on top of first half-gap layer 308. Second half-gap layer 312 is deposited on top of sensor 310 and first half gap-layer 308. Shared pole seed layer 314 is deposited on top of second half-gap layer 312. Shared pole layer 316 is deposited on top of shared pole seed layer 314. In a merged MR head layers 314 and 316 serve as flux shields for sensor 300 and also as a bottom pole for the write portion of the head, thereby providing a shared shield/pole structure. Writer gap layer 318 is formed on top and at a pole tip end of shared pole layer 316. Also, coil insulator 324 is formed on top and away from the pole tip end of shared pole layers 316. Coil insulator 324 typically includes multiple insulator layers. Coils 326 are deposited in between layers of coil insulator 324. The top pole of the write head portion of the merged MR head is then formed by depositing top pole seed layer 320 on top of writer gap layer 318 and coil insulator 324. Finally, top pole layer 322 is deposited on top of top pole seed layer 320.

Prior art merged MR heads have employed top pole seed layer 320 adjacent to gap layer 316 to achieve a higher saturation moment. However, materials chosen for top pole seed layer 320 in prior art heads typically possess high magnetic permeability and moderately soft magnetic properties in addition to a desirable saturation magnetic moment. This is due to an assumption that a combination of these properties are necessary in each individual magnetic layer of the write head. Consequently, materials with very high saturation moment but low permeability were regarded as unsuitable for use in top pole seed layer 320 of prior art merged MR head 300.

Figure 4:
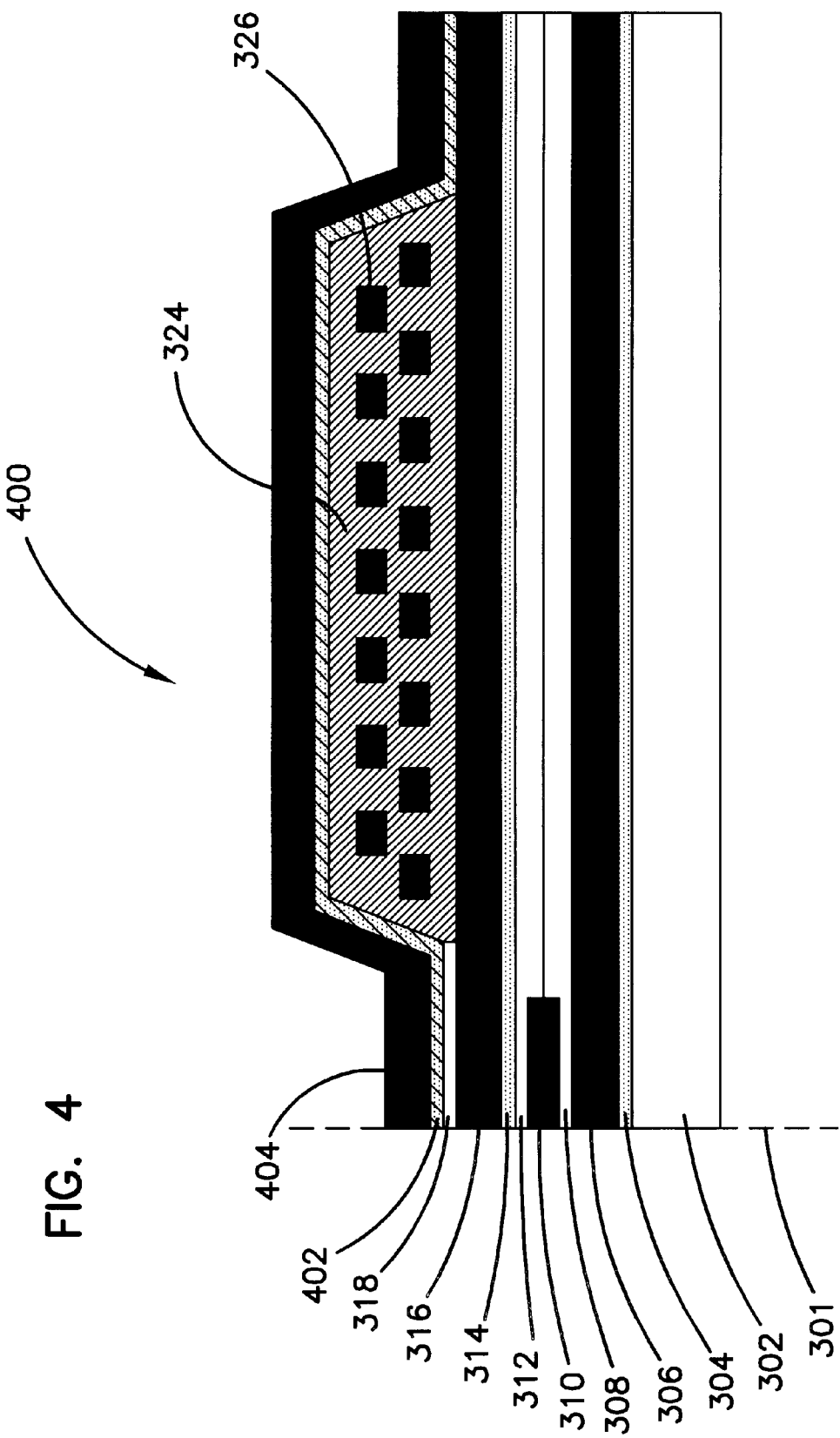
FIGS. 4 and 5 are cross-sectional views of a transducing head in accordance with the present invention taken along a plane normal to an ABS of the transducing head.

Referring now to FIG. 4, a side cross-sectional schematic illustration of a high moment merged MR head 400 in accordance with the present invention is shown. In general, the fabrication process and the layers used for high moment merged MR head 400 are similar to those of prior art merged MR head 300. However, in contrast to the high permeability material used in prior art top pole seed layer 320, the present invention utilizes a low permeability, high saturation moment material for top pole seed layer 402. Tests show that even though the permeability of the material used for top pole seed layer 402 is low, the permeability of the material itself is not strictly important, but rather it is the properties of the magnetically coupled layers that are critical. Therefore, a low permeability material can be employed if it is coupled to a high permeability material, thereby making the combined system have a suitable high permeability.

Embodiments of the present invention employ an alloy of FeCo for top pole seed layer 402. The atomic percentage of Co in FeCo top pole seed layer 402 is approximately in the range of 30–50 and preferably in the range of 37–50 with about 40 being most preferable. The atomic percentage of Fe in FeCo seed layer 402 is preferably in the range of 50–63, and most preferably, equals about 60. $Fe_{60}Co_{40}$ (the most preferable combination of Fe and Co) has a very high saturation moment of approximately 2.4 Tesla and a low permeability of about 10–100 as an individual layer. However, when used for top pole seed layer 402 coupled with high permeability top pole layer 404, the permeability of $Fe_{60}Co_{40}$ layer increases substantially to about 1400–1600. $Ni_{78}Fe_{22}$, $Ni_{45}Fe_{55}$, and $Co_{65}Ni_{20}Fe_{15}$ have been employed in top pole layer 404.

As in the case of permeability, coercivity of the $Fe_{60}Co_{40}$ layer, when used for seed layer 402, depends not upon properties the individual layer but instead upon the properties of the coupled system that includes high moment top pole seed layer 402 and magnetically soft adjacent top pole layer 404. For example, the coercivity of a 2000 Å thick $Fe_{60}Co_{40}$ layer which is typically 50–80 Oe can be reduced to 1–3 Oe by coupling it to a film of a magnetically soft material like $Co_{65}Ni_{20}Fe_{15}$.

Figure 5:
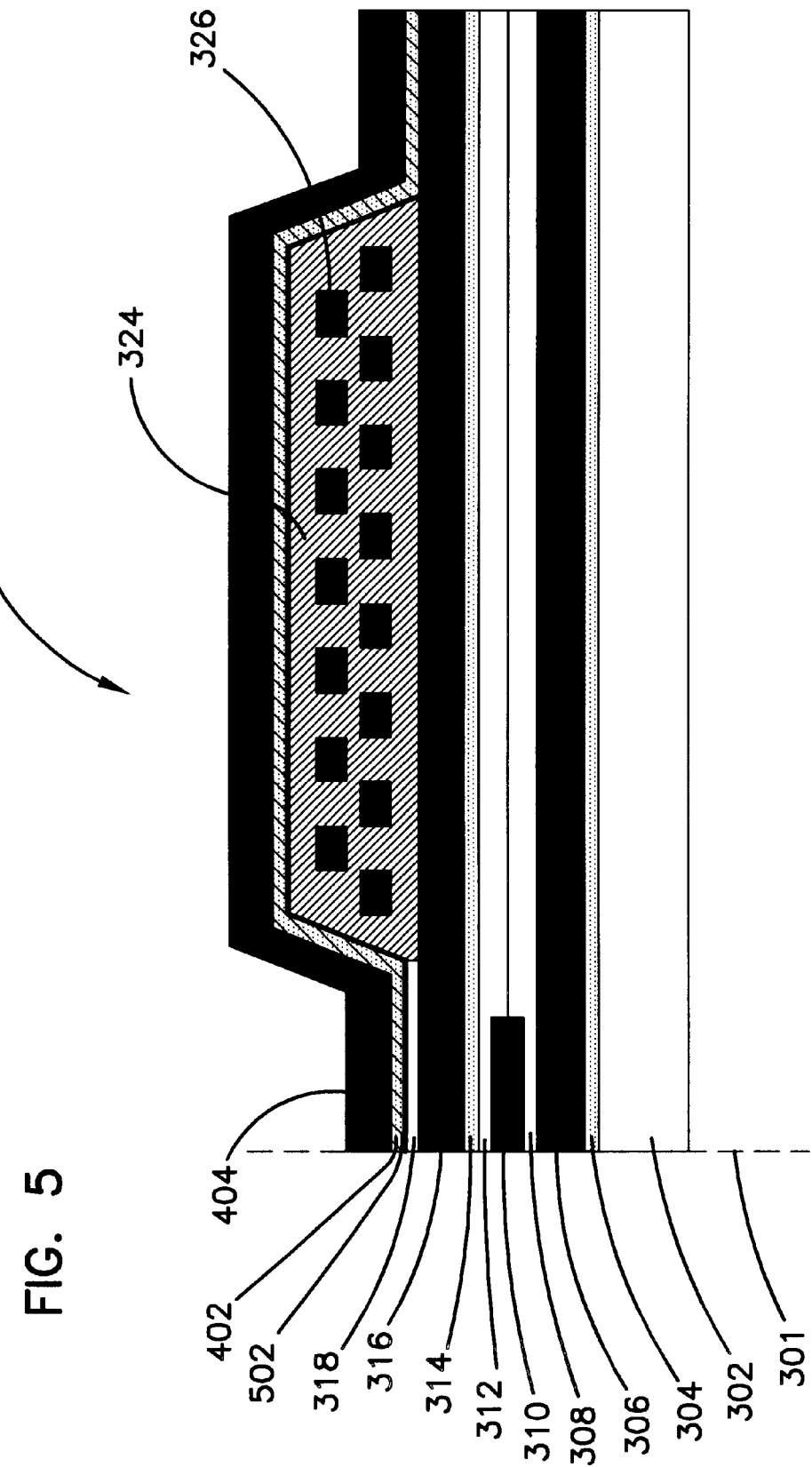

Coercivity of $Fe_{60}Co_{40}$ also depends on sputtering pressure, seed layer thickness, and the use of an under-layer. FIG. 5 illustrates a side cross-section of a high moment merged MR head 500 in accordance with the present invention with an under-layer 502 positioned below and in contact with top pole seed layer 402. As stated above, coercivity of a 2000 Å thick seed layer is in the range 50–80 Oe. This can be reduced to about 20 Oe by either using $Ni_{48}Fe_{12}Cr_{40}$ under-layer 502 or by thermal annealing for about two hours at 220° C. in 250 G field. Films, rich in Fe and sputtered on NiFeCr under-layer 502, are known to have stronger bcc (110) texture and are magnetically softer than the films made without under-layer 502.

Additionally, properties such as thermal stability and adequate corrosion resistance are desirable for the material used in top pole seed layer 402. These properties help in the manufacturing process, performance and reliability of MR heads 400 and 500. $Fe_{60}Co_{40}$ has been found to be thermally stable up to about 350° C. Further, it has been determined, by experiment, that corrosion resistance of $Fe_{60}Co_{40}$ films in both acidic and neutral solutions is comparable to other high saturation moment alloys used in recording heads, for example, $Ni_{45}Fe_{55}$, $Co_{65}Ni_{20}Fe_{15}$, and $Co_{45}Ni_{40}Fe_{15}$. Corrosion testing in most environments that $Fe_{60}Co_{40}$ may come in contact with during manufacturing (plating, wet etching, machining, storage, etc.) were conducted. The $Fe_{60}Co_{40}$ seed layer was found to be compatible with these environments.

Fabricated recording heads containing a $Fe_{60}Co_{40}$ seed layer demonstrated a significant improvement in OVW (3–5 dB) over recording heads employing a 2.1 Tesla $Co_{40}Ni_{15}Fe_{45}$ seed layer. A high density recording head using a $Fe_{60}Co_{40}$ seed layer in accordance with the present invention showed performance improvements over other high density recording heads when used for recording at 45 $Gb/in^2$. Also, the manufacturing process with $Fe_{60}Co_{40}$ seed layer is robust and compatible with the wafer factory and operation environment. Recording heads with a $Fe_{60}Co_{40}$ seed layer were used in 10, 20 and 50 $Gb/in^2$ wafers.

Some embodiments of the invention include Cr in the FeCo alloy used for top pole seed layer 402. The atomic percentage of Cr in the FeCoCr layer is approximately 1–24 and preferably 1–10. The atomic percentage of Fe is in the range of 54–59.4, and the atomic percentage of Co is in the range of 36–39.6. The addition of Cr to the FeCo alloy substantially improves corrosion resistance.

The high saturation moment material used for top pole seed layer 402 (of FIG. 4) in above embodiments of the present invention, may also be employed in the additional layer right above the bottom pole. Thus, a material with a high saturation magnetic moment with previously considered poor magnetic properties can be used in write heads by appropriate coupling with other layers that have favorable magnetic properties.

The above embodiments described are suitable for a longitudinal recording scheme. In addition, it will be understood by one skilled in the art that other layer configurations employing high saturation low permeability layers in writer poles may be used in a perpendicular recording scheme without departing from the scope and spirit of the invention.

Although the above examples involve the use of an FeCo alloy, other high moment materials, perhaps undiscovered at present, that do not individually display low coercivity and high permeability can be satisfactorily employed in a write head by coupling these materials to an adjacent soft, high permeability layer.

The present invention can be summarized in reference to the figures, which include a cross-sectional view of MR heads 400 and 500. Magnetic head 400 in a magnetic storage system 100 includes gap layer 318 which separates a pair of poles (a bottom pole which is a combination of layers 314 and 316 and a top pole which is a combination of layers 402 and 404). At least one pole of the pair of poles includes a pole layer formed of a high permeability material (top pole layer 404 shown in FIG. 4) and a seed layer (top pole seed layer 402 shown in FIG. 4) adjacent to the pole layer. Seed layer 402 is formed of a high moment low permeability material having a high saturation magnetic moment greater than 2.1 Tesla and a low permeability of about 10–100. The high permeability material of pole layer 404 causes the permeability of the adjacent seed layer to substantially increase from about 10–100 to about 1400–1600, thereby providing a pole with high permeability and high saturation moment.

In some embodiments of magnetic head 400, the high moment low permeability material of seed layer 402 is an alloy of Fe—Co with an atomic percentage of Co is in the range of 37 to 50, and an atomic percent of Fe in the range of 50 to 63.

In some embodiments of the present invention, the high moment low permeability material of the seed layer is $Fe_{60}Co_{40}$. In some embodiments, the high moment low permeability material of seed layer 402 is FeCoCr with an atomic percent of Fe in the range of 54 to 59.4, an atomic percent of Co in the range of 36 to 39.6, and an atomic percent of Cr in the range of 1 to 10.

In some embodiments, the high permeability material of pole layer 404 is $Co_{65}Ni_{20}Fe_{15}$. Some embodiments of the present invention also include an under layer 406 (FIG. 5 MR head 500) upon which seed layer 402 is formed. Under layer 406 is formed of a material that causes the coercivity of the seed layer to reduce. In some embodiments of the present invention, under layer 406 is formed of NiFeCr, with an atomic percent of Ni in the range of 48 to 51 percent, an atomic percent of Fe in the range of 11 to 12 percent, and an atomic percent of Cr in the range of 38 to 40 percent. NiFeCr under layer 406 reduces the coercivity of the seed layer from about 50–80 Oe to about 20 Oe.

Embodiments of the present invention include a method of forming magnetic head 400. The method includes providing a bottom pole having a gap-adjacent-surface. Gap layer 318 is produced in direct overlaying relationship to the gap-adjacent-surface of the bottom pole. Gap layer 318 has an exposed-surface upon which a top pole is formed in direct overlaying relationship to the exposed-surface of the writer gap layer 318. At least one of the top and bottom poles is produced by forming a pole layer of a high permeability material and also forming a seed layer adjacent to the pole layer. Seed layer 402 is formed of a high moment, low permeability material having a high saturation magnetic moment greater than 2.1 Tesla and a low permeability of about 10–100. The high permeability material of pole layer 404 causes the permeability of adjacent seed layer 402 to substantially increase from about 10–100 to about 1400–1600, thereby providing a pole with high permeability and high saturation moment.

In some embodiments, forming seed layer 402 is carried out with an alloy of FeCo having an atomic percentage of Co is in the range of 37 to 50, and an atomic percent of Fe in the range of 50 to 63. In some embodiments, forming seed layer 402 is carried out with $Fe_{60}Co_{40}$.

In some embodiments of the present invention forming seed layer 402 is carried out with FeCoCr having an atomic percent of Fe in the range of 54 to 59.4, an atomic percent of Co in the range of 36 to 39.6, and an atomic percent of Cr in the range of 1 to 10.

In some embodiments, forming pole layer 404 is carried out with $Co_{65}Ni_{20}Fe_{15}$. Some embodiments include forming an under layer 406 upon which seed layer 404 is formed. Under layer 406 is formed of a material that causes the coercivity of seed layer 404 to reduce. In some embodiments, forming under layer 406 is carried out with NiFeCr, having an atomic percent of Ni in the range of 48 to 51 percent, an atomic percent of Fe in the range of 11 to 12 percent, and an atomic percent of Cr in the range of 38 to 40 percent, the NiFeCr under layer reduces the coercivity of the seed layer from about 50–80 Oe to about 20 Oe.

In some embodiments of the present invention thermal annealing is conducted for about 2 hours at 220° C. in a 250 G field to reduce the coercivity of seed layer 402.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic head while maintaining substantially the same functionality without departing from the scope and spirit of the present invention. In addition, although the preferred embodiment described herein is directed to a high saturation low permeability seed layer employed in a write head pole for a magnetoresistive head in a magnetic disc storage system, it will be appreciated by those skilled in the art that the teachings of the present invention can be applied to other systems employing different magnetic write head designs, like metal-in-gap heads or any thin film write heads, without departing from the scope and spirit of the present invention. Other layer configurations, compositions and orientations, both known or yet to be discovered, can advantageously use the present invention. In some embodiments, the seed layer can be separated from the pole layer by intermediate layer(s). Further, the head of the present invention can be used on any type of storage system or device which writes and/or senses magnetically and is not limited to the disc drive specifically shown herein.

What is claimed is:

1. A magnetic head, comprising:
    a gap layer;
    a pair of poles separated by the gap layer with at least one pole of the pair of poles comprising:
        a pole layer formed of a high permeability material; and
        a seed layer adjacent to the pole layer, the seed layer formed of a high moment low permeability material having a high saturation magnetic moment greater than 2.1 Tesla and a low permeability of about 10–100, such that the high permeability material of the pole layer causes the permeability of the adjacent seed layer to substantially increase from about 10–100 to about 1400–1600, thereby providing a pole with high permeability and high saturation moment.

2. The magnetic head of claim 1, wherein the high moment low permeability material of the seed layer is an alloy of FeCo with an atomic percentage of Co is in the range of 37 to 50, and an atomic percent of Fe in the range of 50 to 63.

3. The magnetic head of claim 1, wherein the high moment low permeability material of the seed layer is $Fe_{60}Co_{40}$.

4. The magnetic head of claim 1, wherein the high moment low permeability material of the seed layer is FeCoCr, with an atomic percent of Fe in the range of 54 to 59.4, an atomic percent of Co in the range of 36 to 39.6, and an atomic percent of Cr in the range of 1 to 10.

5. The magnetic head of claim 1, wherein the high permeability material of the pole layer is selected from the group consisting of $Co_{65}Ni_{20}Fe_{15}$, $Ni_{45}Fe_{55}$ and $Ni_{80}Fe_{20}$.

6. The magnetic head of claim 1, further comprising an under layer upon which the seed layer is formed, the under layer is formed of a material that causes the coercivity of the seed layer to reduce.

7. The magnetic head of claim 6, wherein the under layer is formed of NiFeCr, with an atomic percent of Ni in the range of 48 to 51 percent, an atomic percent of Fe in the range of 11 to 12 percent, and an atomic percent of Cr in the range of 38 to 40 percent, the NiFeCr under layer reduces the coercivity of the seed layer from about 50–80 Oe to about 20 Oe.

8. A storage system that includes the magnetic head of claim 1.

9. A storage system using a perpendicular recording scheme that includes the magnetic head of claim 1.

10. A method of forming a magnetic head, the method comprising:
    (a) providing a bottom pole having a gap-adjacent-surface;
    (b) producing a writer gap layer in direct overlaying relationship to the gap-adjacent-surface of the bottom pole, the writer gap layer having an exposed-surface; and
    (c) forming a top pole in a direct overlaying relationship to the exposed-surface of the writer gap layer,
    wherein at least one of steps (a) and (c) further comprises:
    (d) forming a pole layer of a high permeability material; and
    (e) forming a seed layer adjacent to the pole layer, the seed layer formed of a high moment low permeability material having a high saturation magnetic moment greater than 2.1 Tesla and a low permeability of about 10–100, such that the high permeability material of the pole layer causes the permeability of the adjacent seed layer to substantially increase from about 10–100 to about 1400–1600, thereby providing a pole with high permeability and high saturation moment.

11. The method of claim 10, wherein step (e) is carried out with an alloy of FeCo having an atomic percentage of Co is in the range of 37 to 50, and an atomic percent of Fe in the range of 50 to 63.

12. The method of claim 10, wherein step (e) is carried out with $Fe_{60}Co_{40}$.

13. The method of claim 10, wherein step (e) is carried out with FeCoCr having an atomic percent of Fe in the range of 54 to 59.4, an atomic percent of Co in the range of 36 to 39.6, and an atomic percent of Cr in the range of 1 to 10.

14. The method of claim 10, wherein step (d) is carried out with $Co_{65}Ni_{20}Fe_{15}$.

15. The method of claim 10, further including forming an under layer upon which the seed layer of step (e) is formed, the under layer is formed of a material that causes the coercivity of the seed layer to reduce.

16. The method of claim 15, wherein forming the under layer is carried out with NiFeCr, having an atomic percent of Ni in the range of 48 to 51 percent, an atomic percent of Fe in the range of 11 to 12 percent, and an atomic percent of Cr in the range of 38 to 40 percent, the NiFeCr under layer reduces the coercivity of the seed layer from about 50–80 Oe to about 20 Oe.

17. The method of claim 10, further including thermal annealing for about 2 hours at 220° C. in a 250 G field to reduce the coercivity of the seed layer of step (e).

18. A storage device including a magnetic head made in accordance with the method of claim 10.

19. A magnetic head comprising:
    a pair of poles with each pole of the pair of poles including a pole layer; and
    means, adjacent to at least one pole layer of the pair of poles, for providing a high saturation moment high permeability pole when combined with at least one pole layer of the pair of poles.

* * * * *